United States Patent
Sakumi et al.

(10) Patent No.: US 12,487,681 B2
(45) Date of Patent: Dec. 2, 2025

(54) HAPTIC PEN AND HAPTIC CONTROL WAVEFORM GENERATION METHOD

(71) Applicant: Wacom Co., Ltd., Saitama (JP)

(72) Inventors: Taiga Sakumi, Saitama (JP); Noboru Yamaguchi, Saitama (JP); Shunya Saito, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/907,317

(22) Filed: Oct. 4, 2024

(65) Prior Publication Data
US 2025/0028395 A1 Jan. 23, 2025

Related U.S. Application Data

(63) Continuation of application No. PCT/JP2023/015818, filed on Apr. 20, 2023.

(51) Int. Cl.
*G06F 3/01* (2006.01)
*G06F 3/0354* (2013.01)
*G06F 3/038* (2013.01)

(52) U.S. Cl.
CPC .......... *G06F 3/016* (2013.01); *G06F 3/03545* (2013.01); *G06F 3/0383* (2013.01)

(58) Field of Classification Search
None
See application file for complete search history.

(56) References Cited

U.S. PATENT DOCUMENTS

| 9,495,011 | B1* | 11/2016 | Lee ................. G06F 3/03547 |
| 2016/0282970 | A1* | 9/2016 | Evreinov ............ G06F 3/0383 |
| 2024/0118756 | A1* | 4/2024 | Watanabe ............ G06F 3/016 |

FOREIGN PATENT DOCUMENTS

| JP | S55134379 A | 10/1980 |
| JP | 2014120170 A | 6/2014 |
| JP | 2018055165 A | 4/2018 |
| WO | WO 2019220803 A1 | 11/2019 |

OTHER PUBLICATIONS

International Search Report dated Jul. 11, 2023, for the corresponding International Patent Application No. PCT/JP2023/015818, 5 pages. (With English Translation).

* cited by examiner

*Primary Examiner* — Stephen T. Reed
(74) *Attorney, Agent, or Firm* — Seed Intellectual Property Law Group LLP

(57) ABSTRACT

To provide a haptic pen and a haptic control waveform generation method that can suppress an increase in the power consumption necessary for operating a haptic element and that can realize an increase in the continuous operation time. A haptic pen includes a linear resonant actuator (LRA) motor that operates according to a reproduced waveform. The reproduced waveform includes a resonant frequency period including a waveform of a sine wave vibrating at a resonant frequency of the LRA motor and a period including a waveform vibrating at one or more frequencies different from the resonant frequency of the LRA motor.

15 Claims, 18 Drawing Sheets

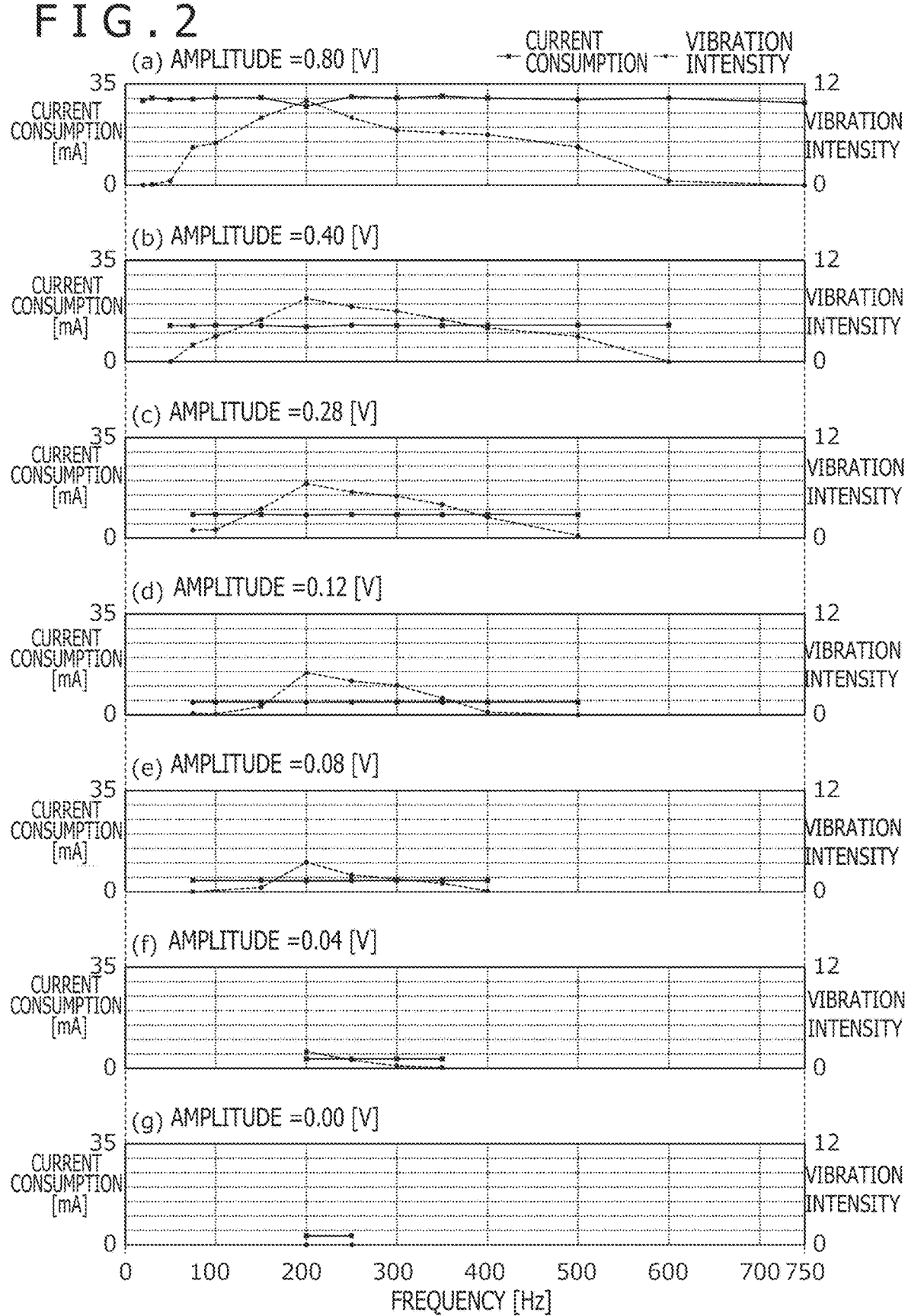

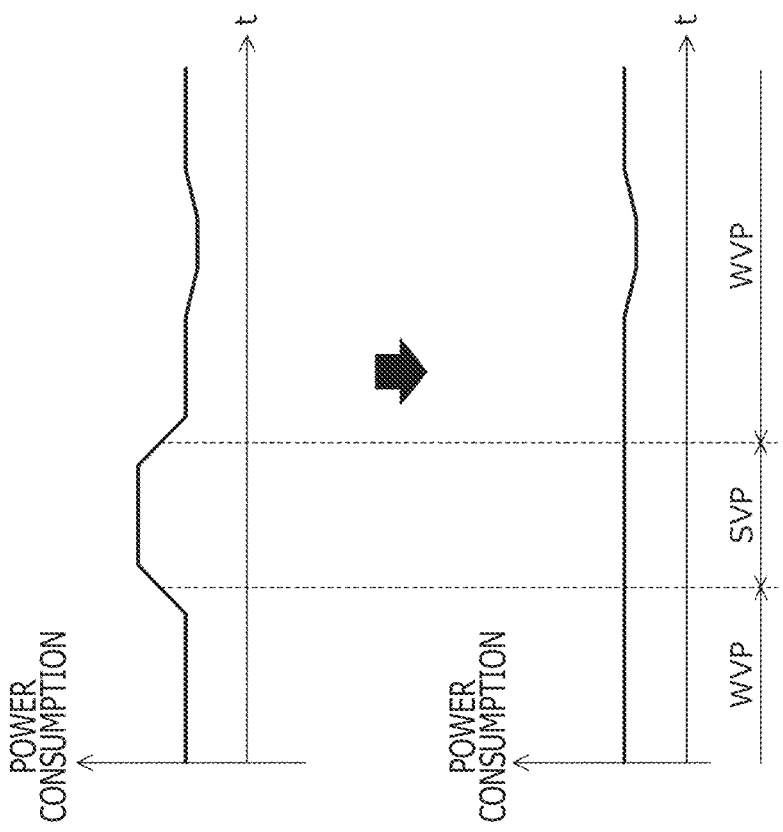
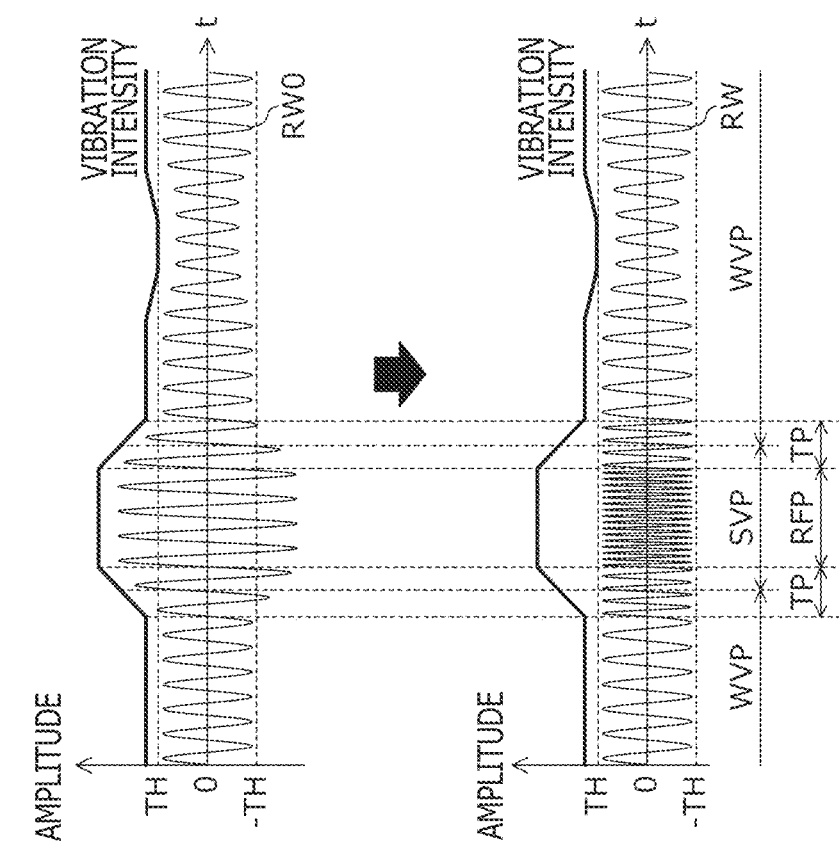
FIG. 3A
FIG. 3B

HAPTIC PEN AND HAPTIC CONTROL WAVEFORM GENERATION METHOD

BACKGROUND

Technical Field

The present disclosure relates to a haptic pen and a haptic control waveform generation method.

Description of the Related Art

In recent years, there are studies for implementing a function of providing a user with vibration in an electronic pen for indicating a position in a panel surface provided in a position detection apparatus. Hereinafter, this function will be referred to as a "haptic function," and the electronic pen with the haptic function will be referred to as a "haptic pen." The haptic function is realized by a haptic element, such as a linear resonant actuator (LRA), a piezoelectric element, and a magnetic fluid, for example. An example of the haptic pen is disclosed in Patent Document 1.

PRIOR ART DOCUMENT

Patent Document

Patent Document 1: PCT Patent Publication No. WO2019/220803

BRIEF SUMMARY

Technical Problem

However, in the currently studied haptic pen, the value of the power necessary for operating the haptic element is larger than the value of the power necessary for the pen operation, and there is a problem that the continuous operation time of the haptic pen is short.

Therefore, embodiments of the present disclosure provide a haptic pen and a haptic control waveform generation method that can suppress an increase in the power necessary for operating a haptic element and that can realize an increase in the continuous operation time.

Technical Solution

The present disclosure provides a haptic pen including a memory that stores a reproduced waveform, and a haptic element that operates according to the reproduced waveform. The reproduced waveform includes a resonant frequency period including a waveform of a sine wave vibrating at a resonant frequency of the haptic element and a period including a waveform vibrating at one or more frequencies different from the resonant frequency.

The present disclosure provides a haptic control waveform generation method including acquiring a series of first digital values representing an original waveform for operating a haptic element provided in a haptic pen, detecting a large amplitude period of the original waveform, in which an amplitude of the original waveform is equal to or greater than a predetermined threshold in the large amplitude period, and generating a series of second digital values which represent a reproduced waveform for operating the haptic element, by replacing at least some of a plurality of first digital values included in the large amplitude period with a plurality of digital values representing a waveform of a sine wave vibrating at a resonant frequency of the haptic element.

Advantageous Effect

According to the present disclosure, strong vibration can be realized without increasing the amplitude of the reproduced waveform. Therefore, the increase in the power necessary for operating the haptic element can be suppressed, and the increase in the continuous operation time of the haptic pen can be realized.

BRIEF DESCRIPTION OF THE SEVERAL VIEWS OF THE DRAWINGS

FIG. 2 is a diagram in which a relation between the frequency of a reproduced waveform RW and the current consumption and vibration intensity of a case where a pulse width modulated signal PWM generated on the basis of the reproduced waveform RW is input to an LRA motor 2 is plotted for each amplitude of the reproduced waveform RW.

FIGS. 3A and 3B are diagrams describing a configuration and an effect of the reproduced waveform RW according to the present disclosure.

DETAILED DESCRIPTION

Hereinafter, an embodiment of the present disclosure will be described in detail with reference to the attached drawings.

Figure 1:
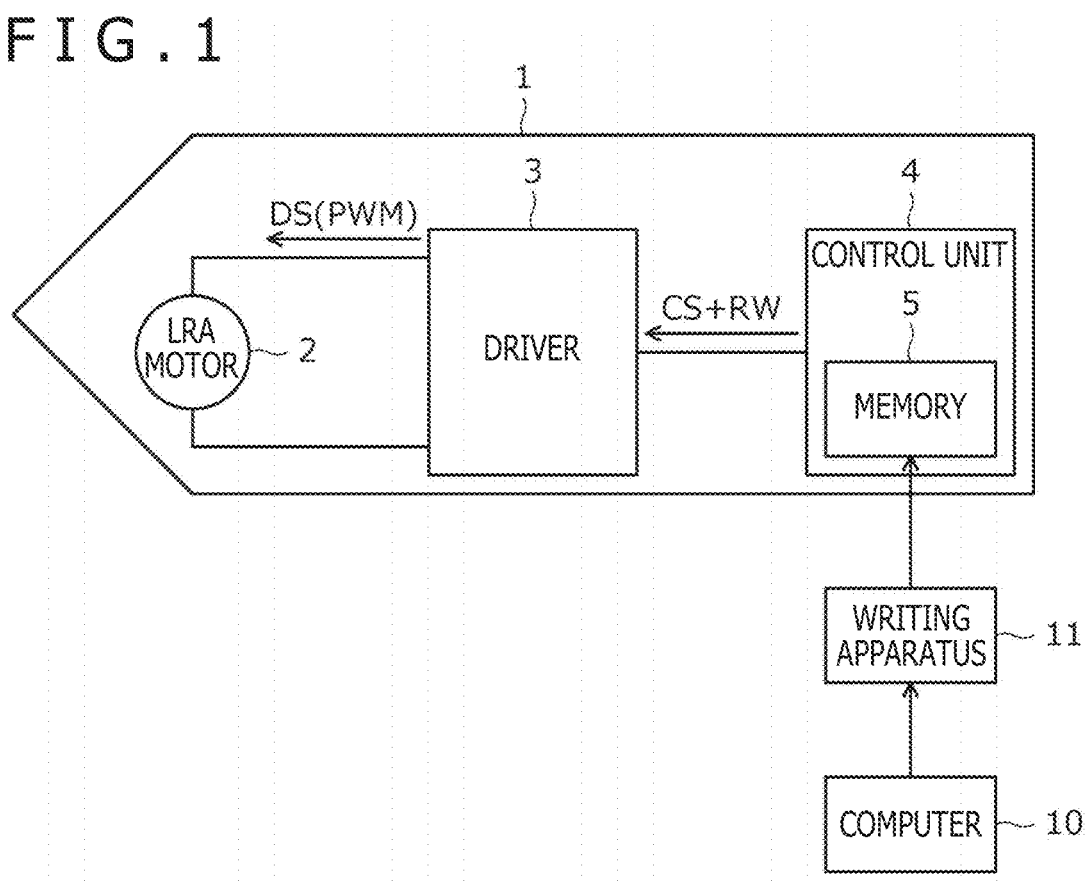
FIG. 1 is a diagram illustrating a configuration of a haptic pen 1 according to an embodiment of the present disclosure.

FIG. 1 is a diagram illustrating a configuration of a haptic pen 1 according to the present embodiment. FIG. 1 also illustrates a computer 10 that generates a reproduced waveform defining an operation method of a haptic element (an LRA motor 2 described later) provided on the haptic pen 1, and a writing apparatus 11 that writes the reproduced waveform generated by the computer 10 to the haptic pen 1.

The computer 10 is, for example, a personal computer installed in a development department of the haptic pen 1. The computer 10 includes a memory that stores programs and data, a processing apparatus that reads the programs from the memory to execute the programs, and a communication apparatus that communicates with external apparatuses including the writing apparatus 11. The writing apparatus 11 is, for example, a personal computer installed in a production line of the haptic pen 1 or a personal computer owned by a user of the haptic pen 1. The writing apparatus 11 includes a memory that stores programs and data, a processing apparatus that reads the programs from the memory to execute the programs, and a communication apparatus that communicates with external apparatuses including the computer 10 and the haptic pen 1. The operation of the computer 10 and the writing apparatus 11 will be described again later with reference to FIG. 4.

The haptic pen 1 is an electronic pen for indicating a position in a panel surface provided on a position detection apparatus not illustrated. The haptic pen 1 includes the LRA motor 2, a driver 3, and a control unit 4 as illustrated in FIG. 1. Although the method of detecting, by the position detection apparatus, the position indicated by the haptic pen 1 is not particularly limited to any kind, an active capacitance system or an electromagnetic resonance system can suitably be used, for example. In addition, the haptic pen 1 includes a battery (not illustrated), and each component in the haptic pen 1 including the LRA motor 2 is configured to use the power supplied from the battery to operate.

The LRA motor 2 is a haptic element that provides the user of the haptic pen 1 (user holding the haptic pen 1) with vibration, and the LRA motor 2 is configured to operate according to a reproduced waveform RW output from the control unit 4. Other types of haptic elements, such as a piezoelectric element and a magnetic fluid, may be used instead of the LRA motor 2.

The driver 3 is an apparatus that generates a drive signal DS of the LRA motor 2 on the basis of the reproduced waveform RW supplied from the control unit 4 and that supplies the drive signal DS to the LRA motor 2. The driver 3 may include, for example, a haptic driver or an audio driver. The LRA motor 2 is configured to operate according to the drive signal DS supplied from the driver 3, to thereby operate according to the reproduced waveform RW. Note that the drive signal DS of the LRA motor 2 in a typical example is a pulse width modulated signal PWM obtained by modulating the pulse width on the basis of the reproduced waveform RW, and the description will be continued below on the basis of this example. However, the drive signal DS of the LRA motor 2 may be an amplitude modulated signal obtained by modulating the amplitude on the basis of the reproduced waveform RW, a frequency modulated signal obtained by modulating the frequency on the basis of the reproduced waveform RW, a phase modulated signal obtained by modulating the phase on the basis of the reproduced waveform RW, or the like. The drive signal DS may be a series of second digital values (described later) representing the reproduced waveform RW.

The control unit 4 is an integrated circuit included in a micro controller unit (MCU), and the control unit 4 plays a role of controlling the components of the haptic pen 1 including the driver 3 and a role of communicating with the position detection apparatus and the writing apparatus 11. The control unit 4 includes a memory 5 and is configured to read programs stored in the memory 5 and execute the programs to thereby execute various processes including the control and the communication.

In addition to the programs defining the operation of the control unit 4, various types of data related to the processes executed by the control unit 4 are also stored in the memory 5. One or more reproduced waveforms RW are included in the various types of data. Each reproduced waveform RW is a waveform generated by the computer 10 on the basis of a waveform obtained by sampling a signal (analog signal or digital signal) including one or a plurality of frequency components, and each reproduced waveform RW is stored in the memory 5 in a format of a series of digital values. Note that the analog signal including one frequency component is, for example, a sound signal including one type of sound, and the analog signal including a plurality of frequency components is, for example, a sound signal or white noise including a plurality of types of sounds. The white noise is a noise signal including a plurality of frequency components mixed at approximately the same intensity. The white noise may be artificially generated by use of effect functions provided in various applications, such as a telephone call app, or the white noise may be a noise signal output from a sound output circuit. Hereinafter, the waveform referenced by the computer 10 to generate the reproduced waveform RW will be referred to as an "original waveform RW0." A series of digital values representing the original waveform RW0 will be referred to as a "series of first digital values." A series of digital values representing the reproduced waveform RW will be referred to as a "series of second digital values."

The processes executed by the control unit 4 include a process of generating a control signal CS for controlling the driver 3 and supplying the control signal CS to the driver 3 along with one of one or more reproduced waveforms RW stored in the memory 5. The driver 3 who has received the supply of the control signal CS and the reproduced waveform RW from the control unit 4 executes a process of generating a pulse width modulated signal PWM on the basis of the supplied reproduced waveform RW and supplying the pulse width modulated signal PWM to the LRA motor 2 at a timing based on the supplied control signal CS. As a result, the LRA motor 2 operates according to the reproduced waveform RW supplied by the control unit 4 to the driver 3, at the timing indicated by the control signal CS supplied by the control unit 4 to the driver 3.

FIG. 2 is a diagram in which a relation between the frequency of the reproduced waveform RW and the current consumption and vibration intensity of a case where the pulse width modulated signal PWM generated on the basis of the reproduced waveform RW is input to the LRA motor 2 is plotted for each amplitude of the reproduced waveform RW. First, as for the current consumption, it can be understood from the description of FIG. 2 that the larger the amplitude of the reproduced waveform RW, the larger the current consumption of the LRA motor 2. The current consumption of the LRA motor 2 is hardly changed by the frequency of the reproduced waveform RW. On the other hand, as for the vibration intensity of the LRA motor 2, it can be understood that the larger the amplitude of the reproduced waveform RW, the larger the vibration intensity of the LRA motor 2, which is similar to the case of the current consumption. However, the farther the frequency of the reproduced waveform RW from 200 Hz, the smaller the vibration intensity of the LRA motor 2, with the peak at 200 Hz. The frequency of the reproduced waveform RW with the vibration intensity at the peak (200 Hz in the example of FIG. 2) is a value unique to the LRA motor 2 independent of the amplitude of the reproduced waveform RW, and such a frequency will be referred to as a "resonant frequency of the LRA motor 2." The present disclosure is designed to use such a property of the LRA motor 2 to suppress the increase in the power necessary for the operation of the LRA motor 2.

FIGS. 3A and 3B are diagrams describing a configuration and an effect of the reproduced waveform RW according to the present disclosure. An upper diagram of FIG. 3A schematically illustrates an example of the original waveform RW0 and the vibration intensity of the LRA motor 2 obtained on the basis of the original waveform RW0 according to this example. A lower diagram of FIG. 3A schematically illustrates an example of the reproduced waveform RW generated from the original waveform RW0 of the upper diagram and the vibration intensity of the LRA motor 2 obtained on the basis of the reproduced waveform RW according to this example. In addition, an upper diagram of FIG. 3B schematically illustrates the power consumption of a case where the original waveform RW0 illustrated in FIG. 3A is used to drive the LRA motor 2. A lower diagram of FIG. 3B schematically illustrates the power consumption of a case where the reproduced waveform RW illustrated in FIG. 3A is used to drive the LRA motor 2.

Figure 5:
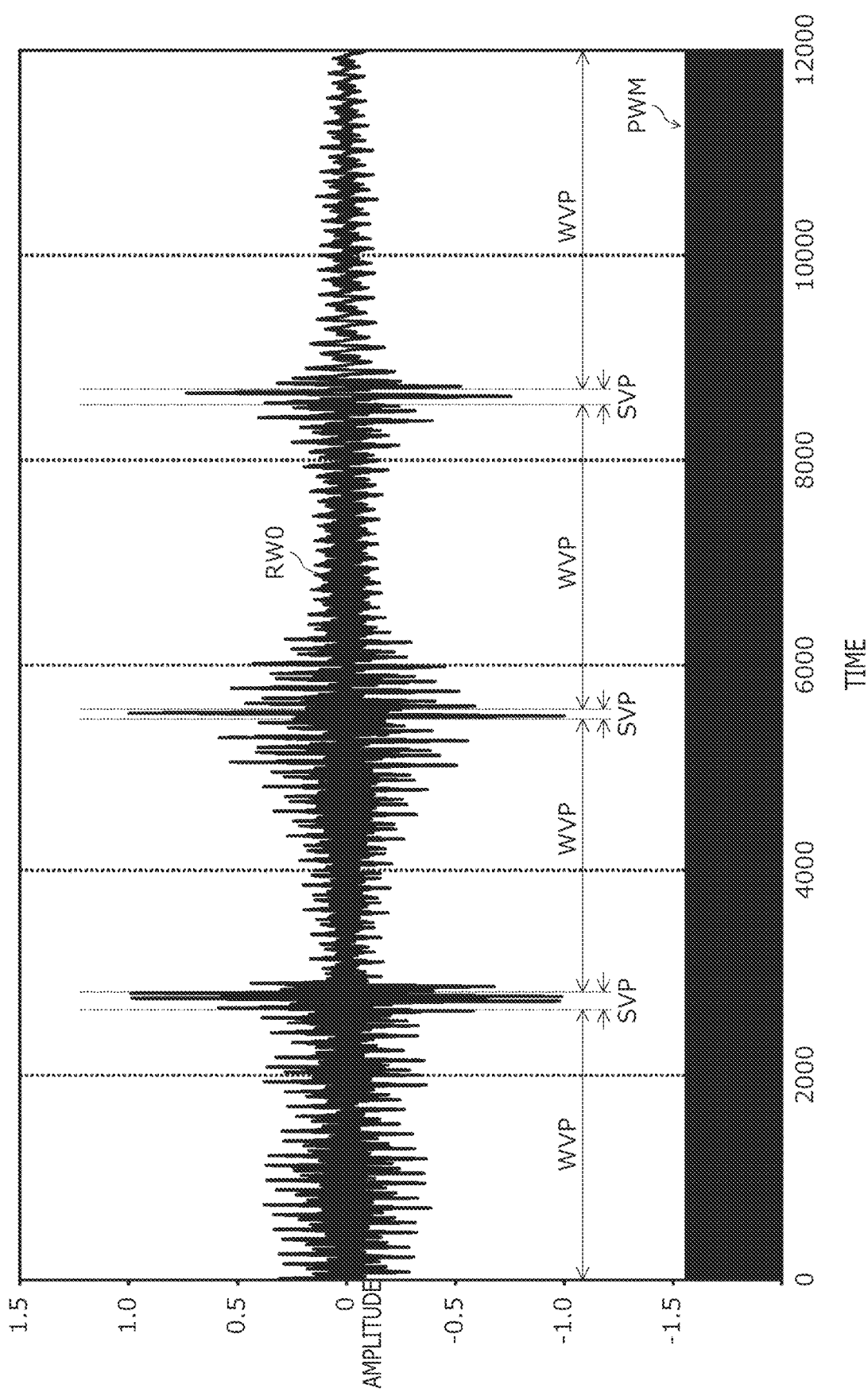
FIG. 5 is a diagram illustrating an example of the original waveform RW0 and the pulse width modulated signal PWM generated from the original waveform RW0 in this example.

First, in the upper diagram of FIG. 3A, the original waveform RW0 is a waveform including a waveform vibrating at one or more frequencies different from the resonant frequency of the LRA motor 2. Since the actual original waveform RW0 is a waveform obtained by sampling the analog signal representing sound as described above, the original waveform RW0 is a waveform obtained by superimposing a plurality of waveforms vibrating at frequencies different from each other (the frequencies may include the resonant frequency of the LRA motor 2), as illustrated in FIG. 5 described later. However, to facilitate the understanding of the disclosure, the original waveform RW0 is expressed by a waveform with a single frequency different from the resonant frequency of the LRA motor 2 in FIG. 3A. In addition, the original waveform RW0 is a waveform in which the amplitude changes according to the amplitude of the original analog signal.

When the frequency of the original waveform RW0 is constant as in the example of FIG. 3A, the vibration intensity and the power consumption of the LRA motor 2 indicate values proportional to the amplitude of the original waveform RW0 as illustrated in the upper diagrams of FIGS. 3A and 3B. Therefore, when the amplitude of the original waveform RW0 becomes large, the power consumption of the LRA motor 2 increases in proportion to the increase in the amplitude, and this shortens the continuous operation time of the haptic pen 1.

Therefore, the reproduced waveform RW generated from the original waveform RW0 is used instead of the original waveform RW0 in the present disclosure. As illustrated in the lower diagram of FIG. 3B, the reproduced waveform RW is a waveform obtained by replacing part of the original waveform RW0 with another waveform. Hereinafter, a process (haptic control waveform generation process) executed by the computer 10 to generate such a reproduced waveform RW from the original waveform RW0 will be described in detail.

Figure 4:
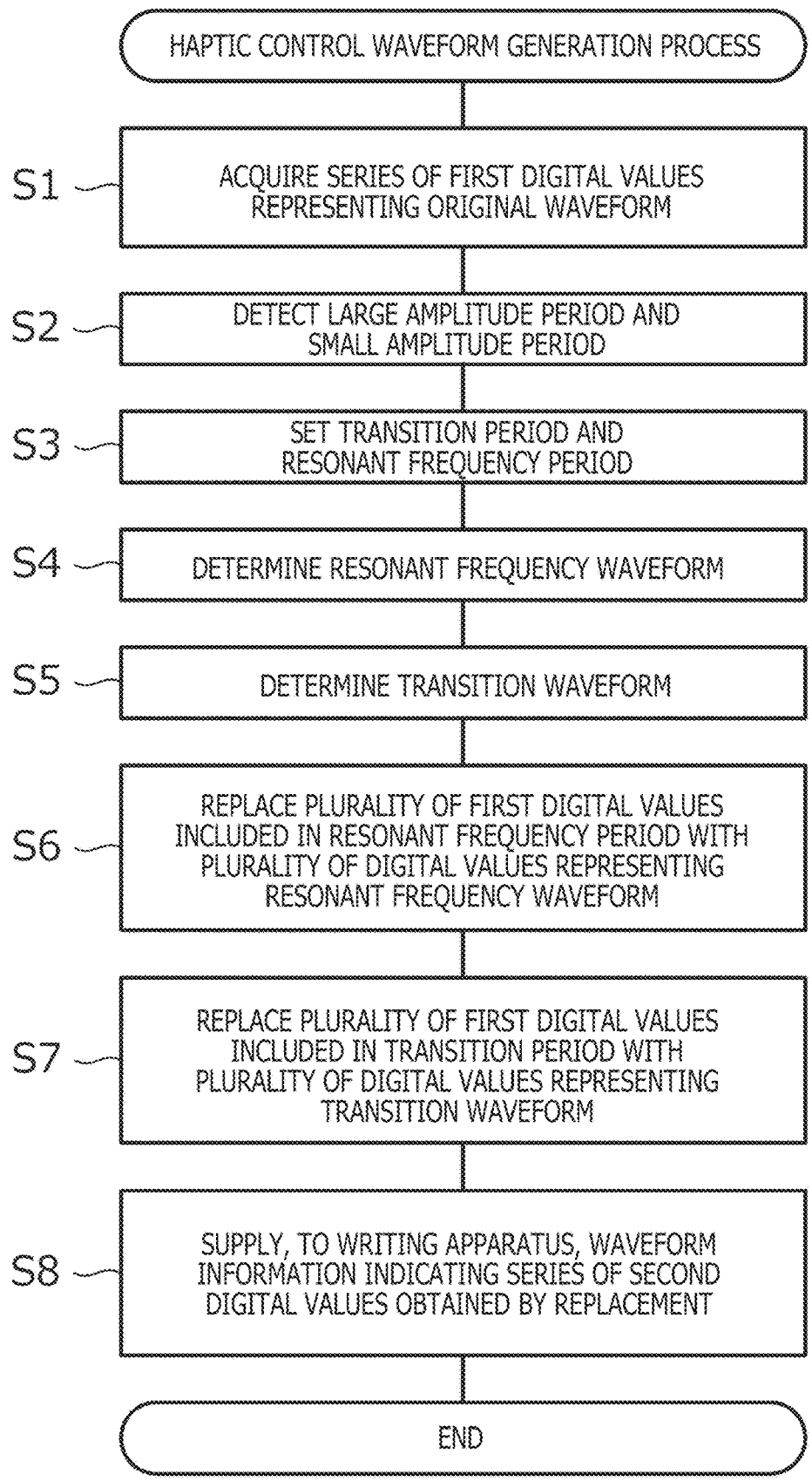
FIG. 4 is a process flow chart illustrating a process executed by a computer 10 to generate the reproduced waveform RW from an original waveform RW0.

FIG. 4 is a process flow chart illustrating a flow of the haptic control waveform generation process executed by the computer 10. As illustrated in FIG. 4, the computer 10 first acquires the series of first digital values representing the original waveform RW0 (S1).

Next, the computer 10 detects, from the original waveform RW0, a large amplitude period SVP satisfying a predetermined condition and a small amplitude period WVP that is a period of the large amplitude period SVP, on the basis of the series of first digital values acquired at S1 (S2). Specifically, the predetermined condition is typically that the amplitude is equal to or greater than a predetermined threshold TH. However, any other conditions may be used according to the intention of the user of the haptic pen 1 or the computer 10 or the like. The specific value of the threshold TH is set in advance in the computer 10. The computer 10 can derive envelopes (positive side, negative side) of the original waveform RW0. The computer 10 can detect, as the large amplitude period SVP, the period in which the absolute value of one of the envelopes is equal to or greater than the threshold TH and detect the other periods as the small amplitude periods WVP.

The computer 10 then sets a transition period TP with any time length at each boundary of the large amplitude period SVP and the small amplitude period WVP and sets, as a resonant frequency period RFP, the part of the large amplitude period SVP not included in the transition periods TP (S3).

Next, the computer 10 determines, for each resonant frequency period RFP set at S3, a resonant frequency waveform for replacing the waveform in the resonant frequency period RFP (S4). The resonant frequency waveform is a waveform of a sine wave vibrating at the resonant frequency of the LRA motor 2 and having the amplitude equal to or smaller than the threshold TH. The specific value of the resonant frequency of the LRA motor 2 is set in advance in the computer 10. The amplitude of the resonant frequency waveform may be a predetermined value equal to or smaller than the threshold TH or may be determined on the basis of the vibration intensity of the LRA motor 2 realized in the resonant frequency period RFP of the original waveform RW0. The latter will be specifically described. The amplitude of the resonant frequency waveform can be determined such that the vibration intensity of the LRA motor 2 realized in the resonant frequency period RFP of the reproduced waveform RW becomes equal to a representative value (such as an average value, an intermediate value, a maximum value, and a minimum value) of the vibration intensity of the LRA motor 2 realized in the resonant frequency period RFP of the original waveform RW0.

Further, the computer 10 determines, for each transition period TP set at S3, a transition waveform for replacing the waveform in the transition period TP (S5). The transition waveform is a waveform for connecting the resonant frequency waveform appearing at one end of the corresponding transition period TP and the original waveform RW0 appearing at the other end to each other. The computer 10 can appropriately determine the amplitude, the frequency, and the phase of the transition waveform on the basis of the value of the resonant frequency waveform at one end of the transition period TP and the value of the original waveform RW0 at the other end of the transition period TP such that the resonant frequency waveform and the original waveform RW0 are continuously connected to each other. However, to prevent the power consumption of the LRA motor 2 in the transition period TP from becoming large, it is preferable that the computer 10 determine the amplitude of the transition waveform in a range not exceeding the threshold TH. In addition, the amplitude, the frequency, and the phase of the transition waveform may be constant or may change in one transition period TP.

Next, the computer 10 replaces a plurality of first digital values included in the resonant frequency period RFP of the original waveform RW0 with a plurality of digital values representing the resonant frequency waveform determined at S4 (S6). In addition, the computer 10 replaces a plurality of first digital values included in the transition period TP of the original waveform RW0 with a plurality of digital values representing the transition waveform determined at S5 (S7).

Lastly, the computer 10 supplies, to the writing apparatus 11 illustrated in FIG. 1, waveform information indicating the series of digital values (series of second digital values) obtained by the replacement at and S7 (S8). Note that, although the waveform information is typically the series of second digital values, the waveform information may be information indicating waveform generation conditions (specifically, data expressed by digital values (for example, digital values representing the amplitude and the frequency) of each time point), when the haptic pen 1 has a function of generating the series of digital values from the waveform generation conditions. The writing apparatus 11 that has received the supply of the waveform information writes the supplied waveform information to the memory 5 of the haptic pen 1 at an appropriate timing. When the waveform information written in this way is the information indicating the waveform generation conditions, the control unit 4 executes a process of generating the series of second digital values (reproduced waveform RW) from the waveform information. As a result, the reproduced waveform RW is stored in the reproduced waveform RW, and the reproduced waveform RW can be used to operate the LRA motor 2 of the haptic pen 1.

FIGS. 3A and 3B will be described again. The reproduced waveform RW illustrated in the lower diagram of FIG. 3A is a waveform generated as described above from the original waveform RW0 in the upper diagram. As can be understood by comparing the lower diagram with the upper diagram of FIG. 3A, although the amplitude of the large amplitude period SVP falls within the threshold TH in the reproduced waveform RW, the vibration intensity similar to that of the original waveform RW0 is realized. This is an effect of the frequency of the reproduced waveform RW being equal to the resonant frequency of the LRA motor 2 (frequency of the LRA motor 2 with the vibration intensity at the peak) in the resonant frequency period RFP. On the other hand, as illustrated in the lower diagram of FIG. 3B, the power consumption of the LRA motor 2 does not increase even in the large amplitude period SVP when the reproduced waveform RW is used. This is an effect of the amplitude of the reproduced waveform RW being suppressed to equal to or smaller than the threshold TH in the large amplitude period SVP. Therefore, it can be stated that the reproduced waveform RW can be used instead of the original waveform RW0 to suppress the increase in the power consumption necessary for operating the LRA motor 2 and realize the increase in the continuous operation time of the haptic pen 1.

FIGS. 5 to 12 are diagrams illustrating more specific examples of the original waveform RW0 and the reproduced waveform RW. In the lower parts of these drawings, the pulse width modulated signal PWM generated from the corresponding original waveform RW0 or reproduced waveform RW is also illustrated as a reference. Further, in these drawings, the vertical axis indicates the amplitude, and the horizontal axis indicates the time. The unit of the horizontal axis is $1/12000$ seconds. The configurations of the original waveform RW0 and the reproduced waveform RW will be described again in detail with reference to these drawings.

FIG. 5 is a diagram illustrating an example of the original waveform RW0 and illustrating the pulse width modulated signal PWM generated from the original waveform RW0 of this example. As illustrated in FIG. 5, although the amplitude of the original waveform RW0 of this example mostly falls within 0.5, the amplitude exceeds and surpasses 0.5 at three sections. Assuming that the threshold TH is 0.5 here, the computer 10 that generates the reproduced waveform RW on the basis of the original waveform RW0 detects the illustrated three large amplitude periods SVP at S2 illustrated in FIG. 4.

Figure 6:
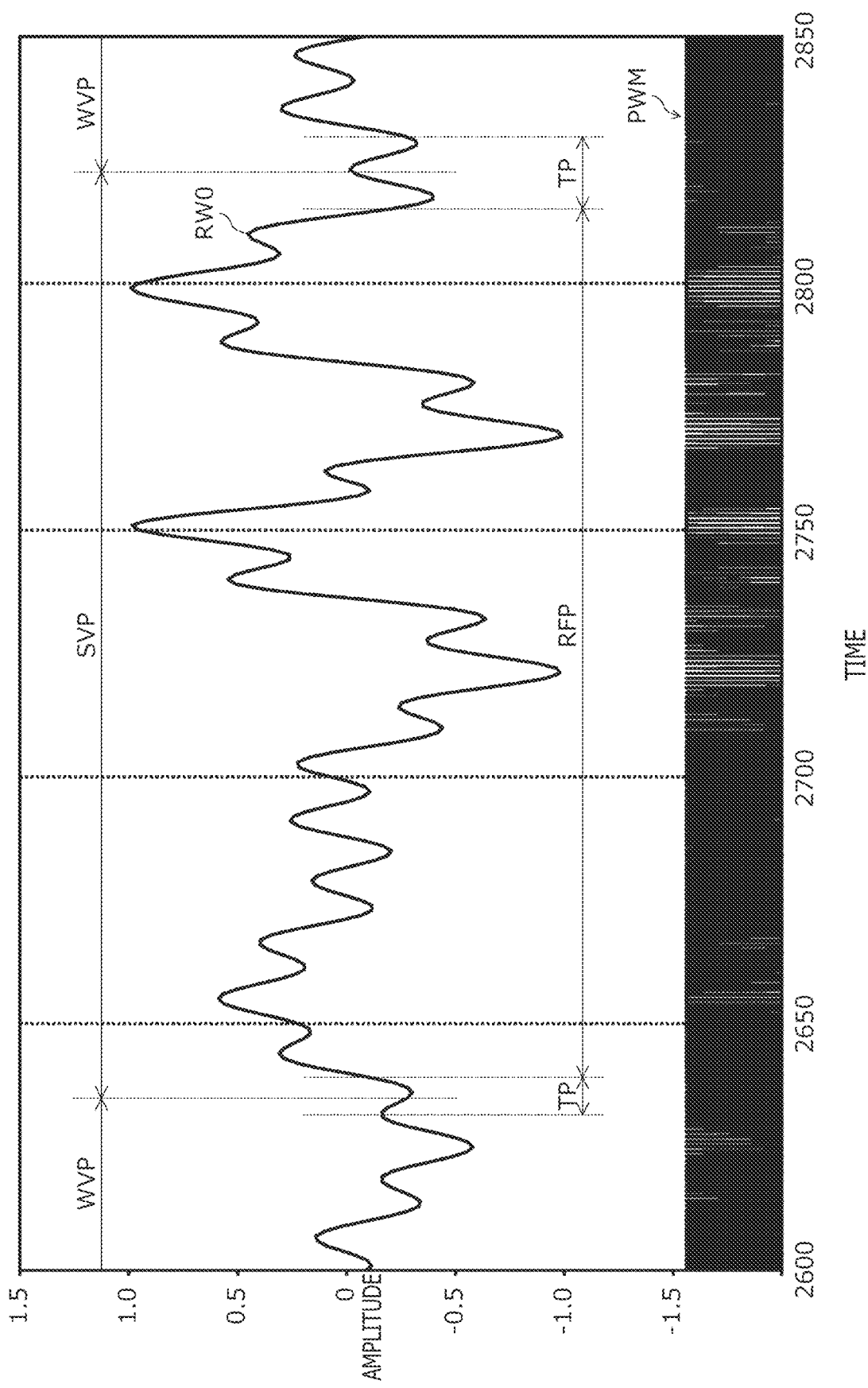
FIG. 6 is a diagram in which the waveform illustrated in FIG. 5 is enlarged near a large amplitude period SVP (first) illustrated in FIG. 5.
Figure 7:
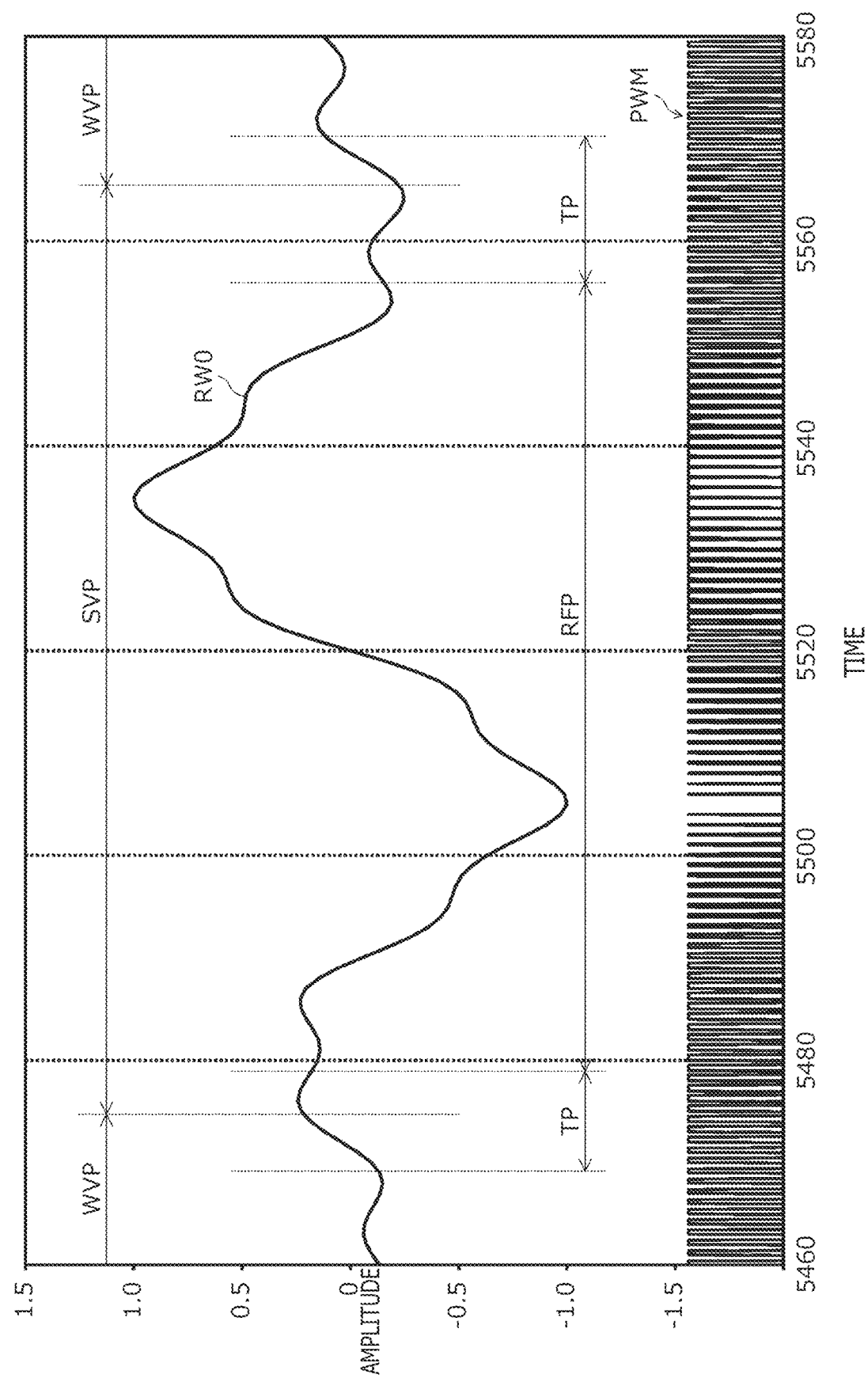
FIG. 7 is a diagram in which the waveform illustrated in FIG. 5 is enlarged near a large amplitude period SVP (second) illustrated in FIG. 5.
Figure 8:
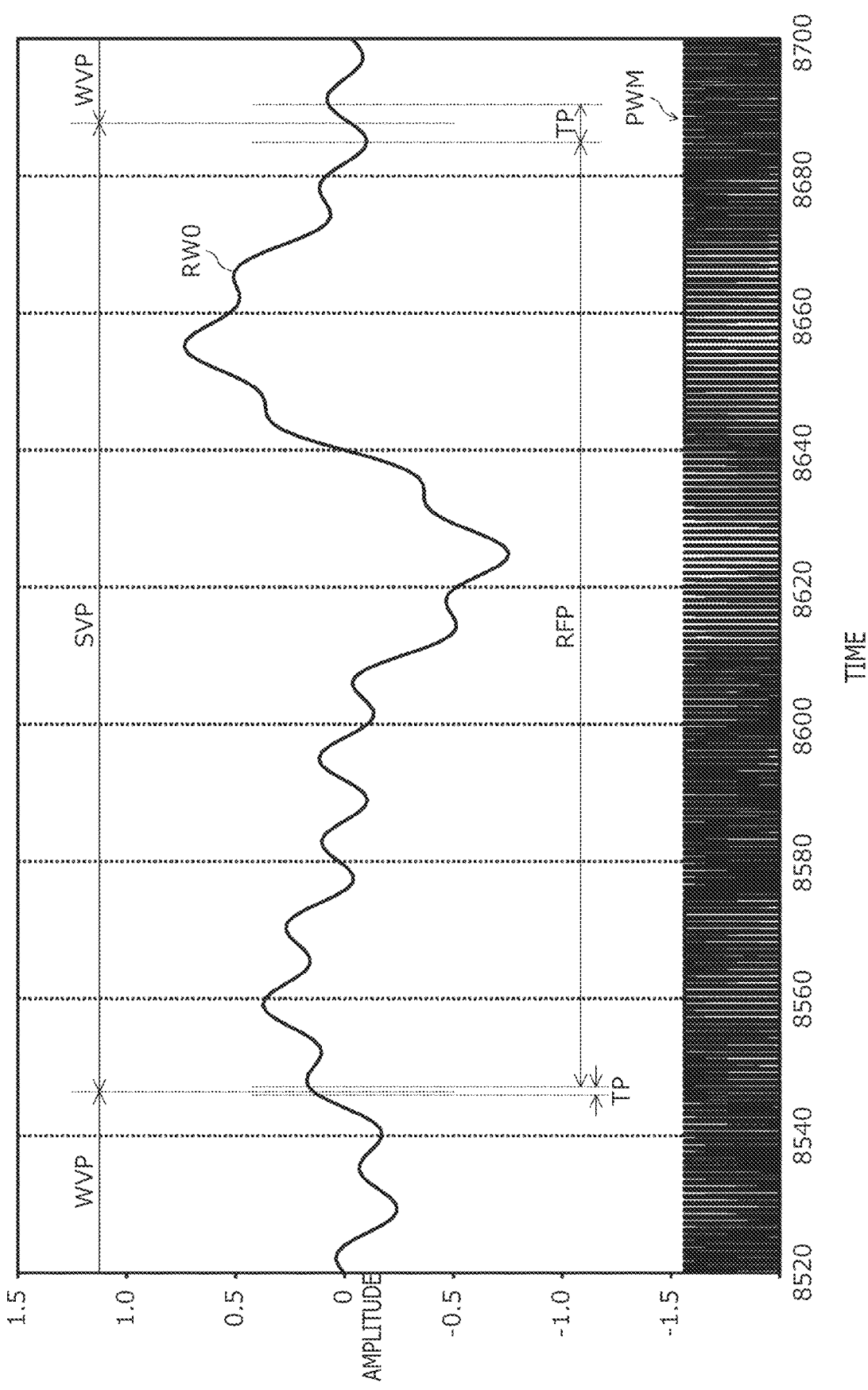
FIG. 8 is a diagram in which the waveform illustrated in FIG. 5 is enlarged near a large amplitude period SVP (third) illustrated in FIG. 5.

FIGS. 6 to 8 are diagrams in which the waveform illustrated in FIG. 5 is enlarged near the three large amplitude periods SVP detected by the computer 10. As illustrated in these drawings, the computer 10 sets the transition periods TP at the boundaries of the large amplitude periods SVP and the small amplitude periods WVP and sets, as the resonant frequency periods RFP, the parts of the large amplitude periods SVP not included in the transition periods TP.

Figure 9:
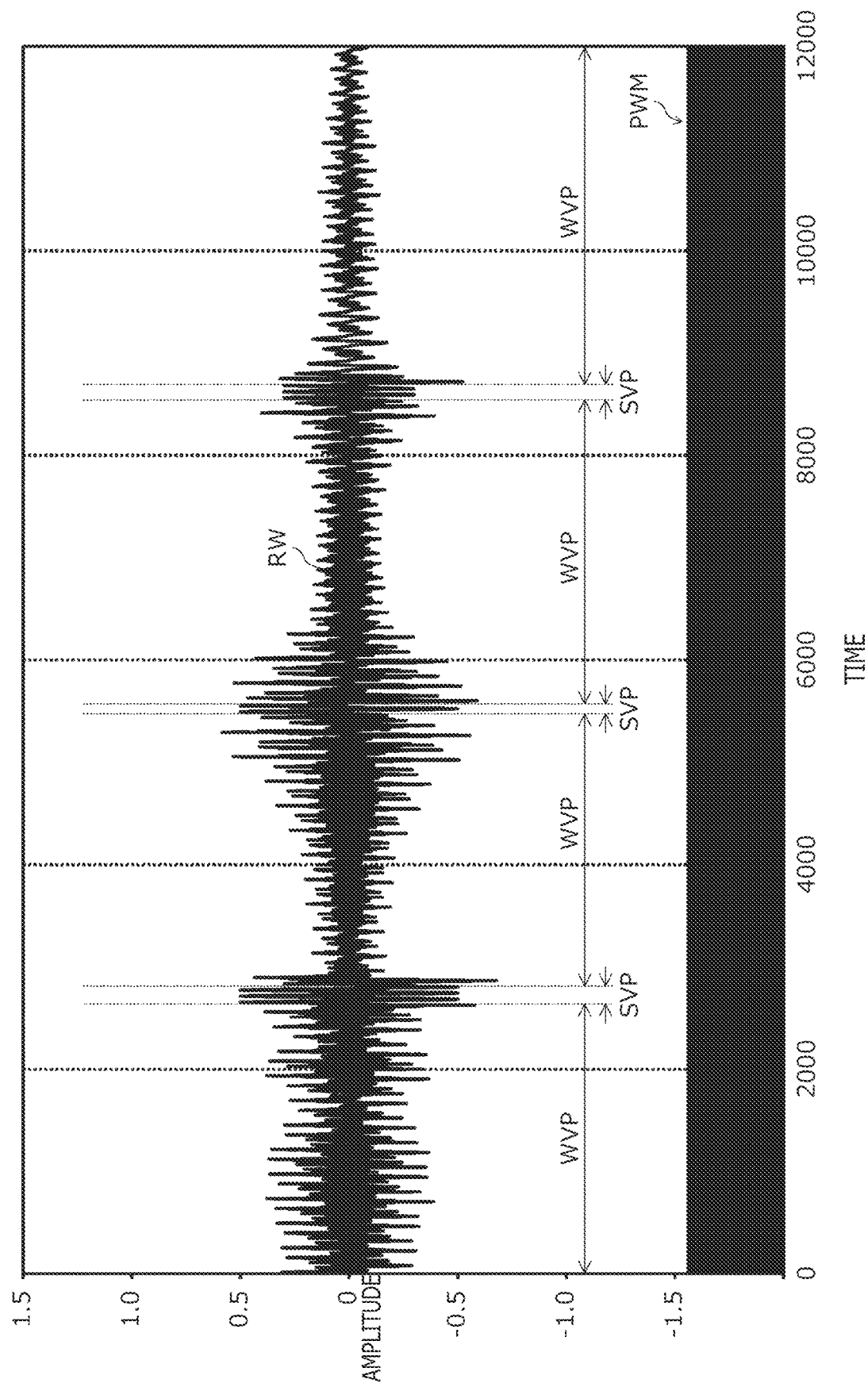
FIG. 9 is a diagram illustrating an example of the reproduced waveform RW generated by the computer 10 on the basis of the original waveform RW0 illustrated in FIG. 5 and the pulse width modulated signal PWM generated from the reproduced waveform RW in this example.
Figure 10:
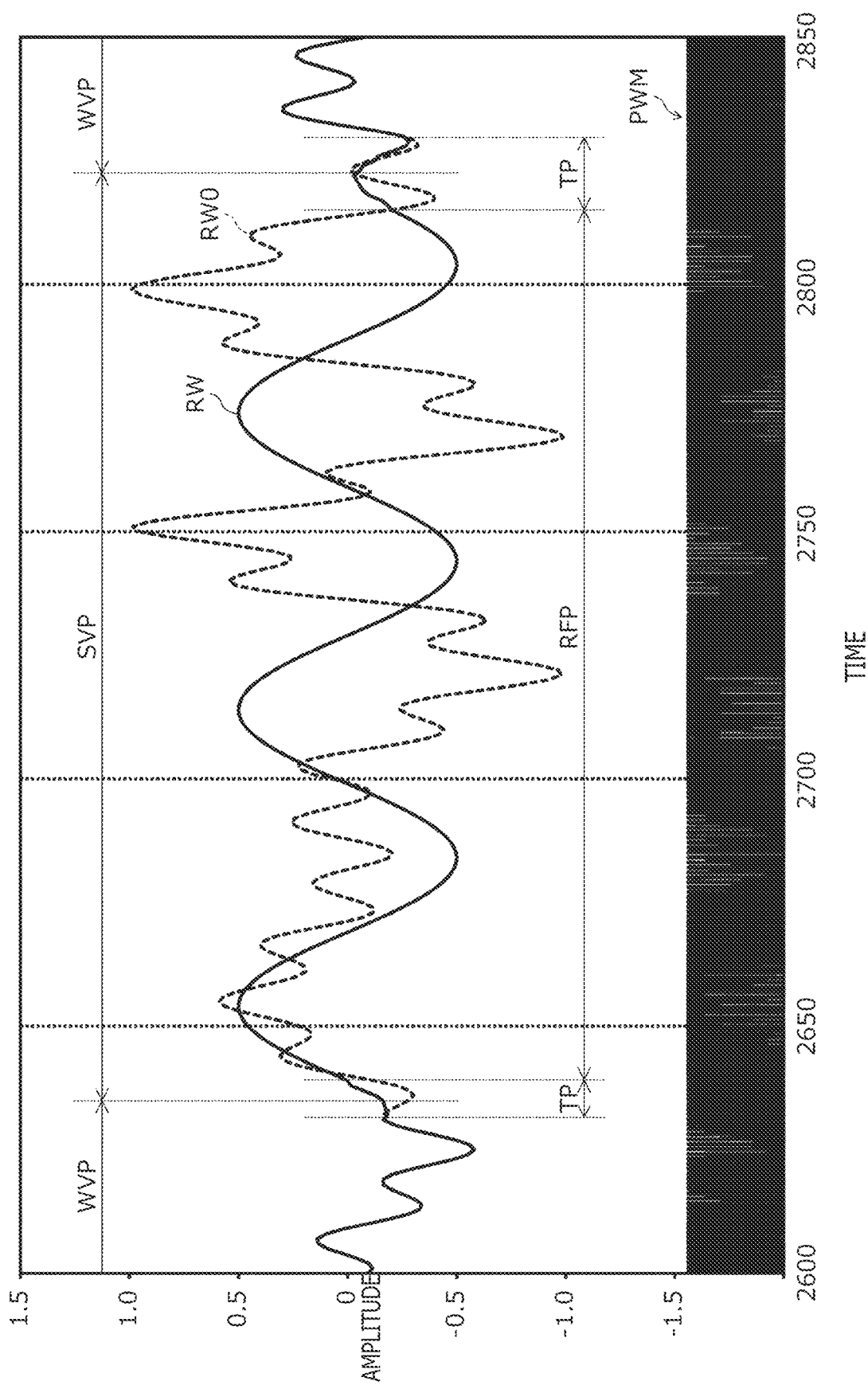
FIG. 10 is a diagram in which the waveform illustrated in FIG. 9 is enlarged near the large amplitude period SVP (first) illustrated in FIG. 9.
Figure 11:
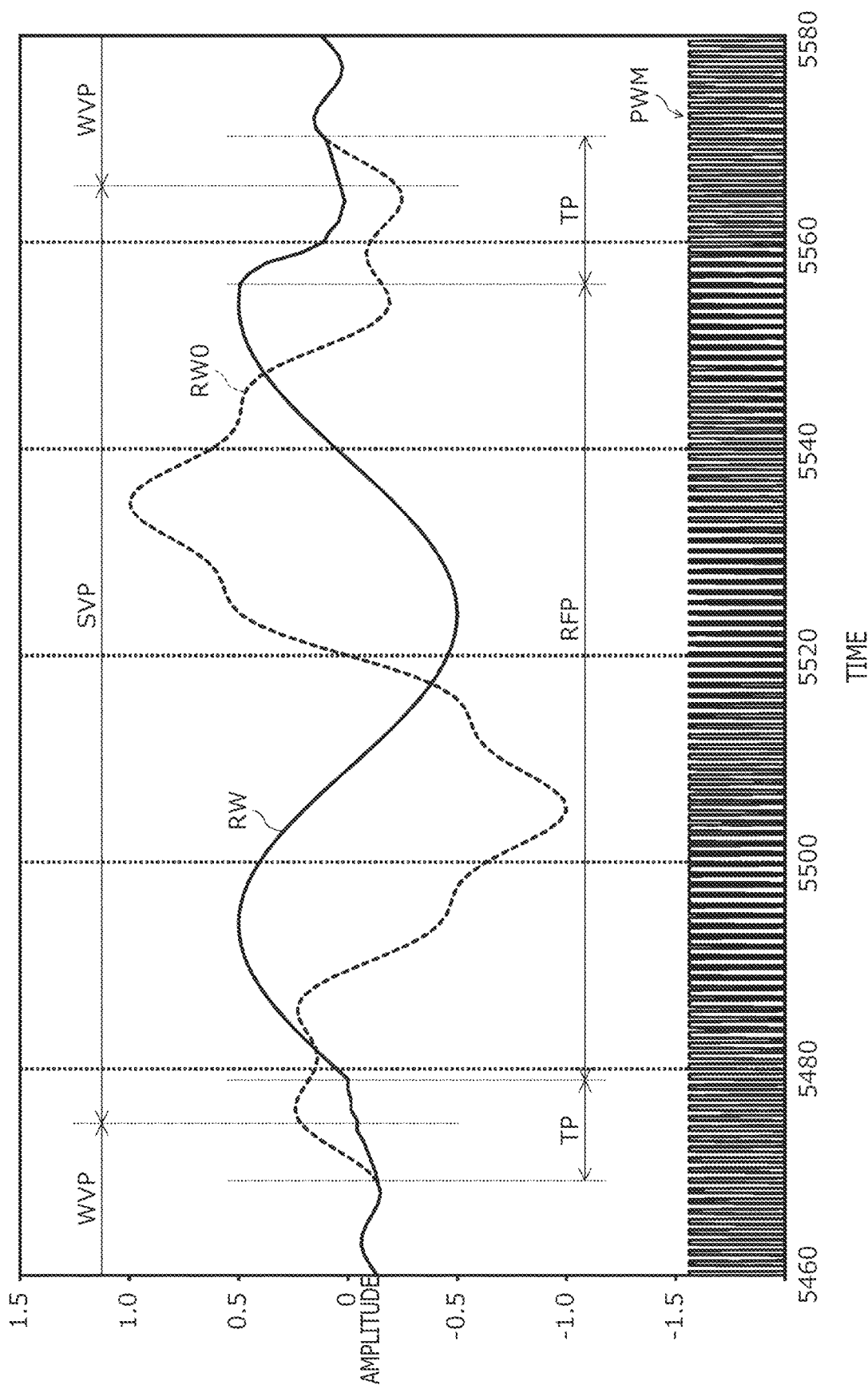
FIG. 11 is a diagram in which the waveform illustrated in FIG. 9 is enlarged near the large amplitude period SVP (second) illustrated in FIG. 9.
Figure 12:
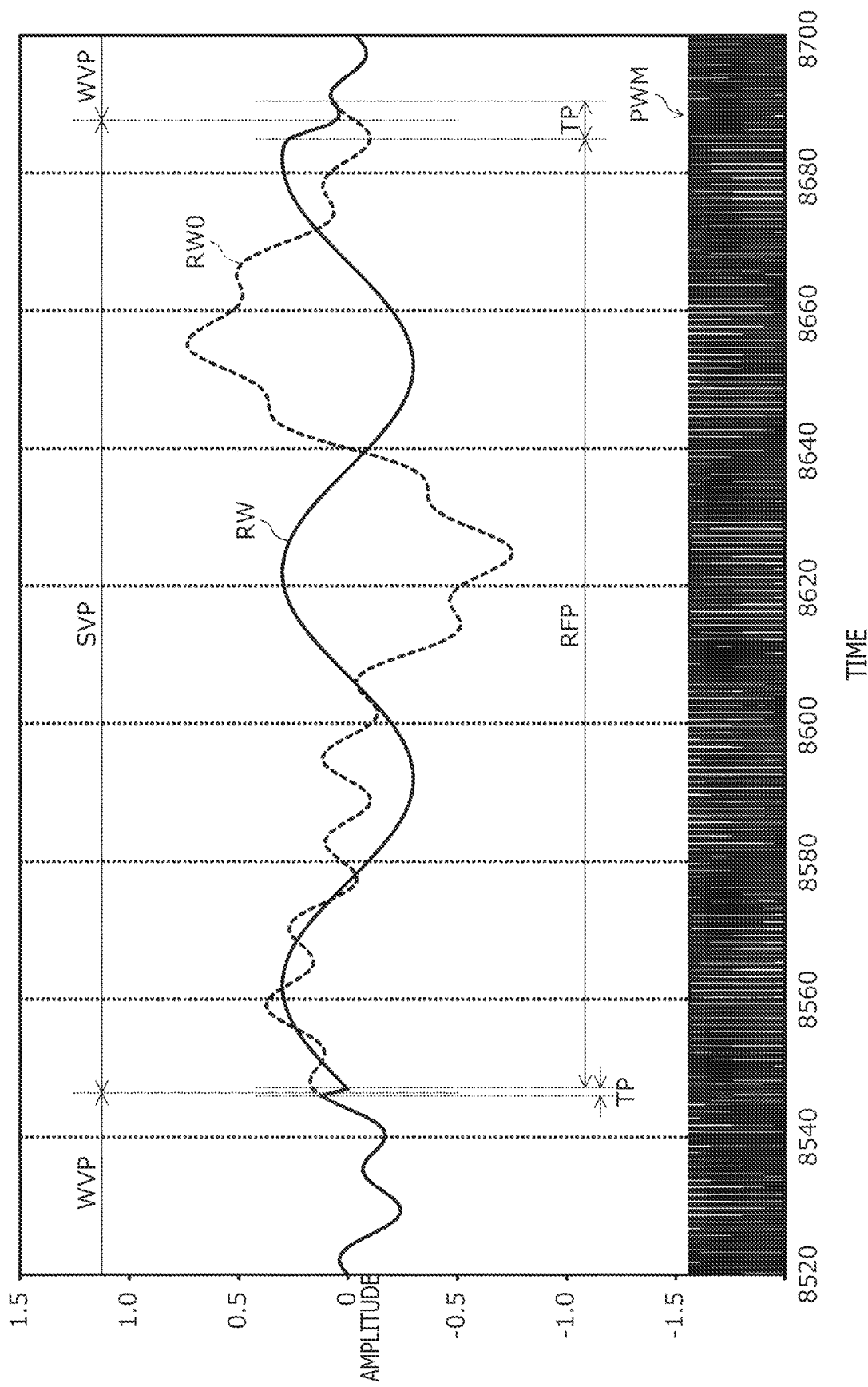
FIG. 12 is a diagram in which the waveform illustrated in FIG. 9 is enlarged near the large amplitude period SVP (third) illustrated in FIG. 9.

FIG. 9 is a diagram illustrating an example of the reproduced waveform RW generated by the computer 10 on the basis of the original waveform RW0 illustrated in FIG. 5 and illustrating the pulse width modulated signal PWM generated from the reproduced waveform RW of this example. In addition, FIGS. 10 to 12 are diagrams in which the waveform illustrated in FIG. 9 is enlarged at the positions corresponding to FIGS. 6 to 8, respectively. The waveform indicated by the dashed line in these drawings is the original waveform RW0 illustrated in FIGS. 6 to 8.

As illustrated in FIGS. 10 to 12, the original waveform RW0 is replaced with the resonant frequency waveform that is a waveform of a sine wave with a constant frequency and a constant amplitude. The frequency of the resonant frequency waveform is the resonant frequency of the LRA motor 2, and the amplitude of the resonant frequency waveform is a predetermined value equal to or smaller than the threshold TH. Further, in the transition period TP, the original waveform RW0 is replaced with the transition waveform that is a waveform for connecting the resonant frequency waveform appearing at one end of the transition period TP and the original waveform RW0 appearing at the other end of the transition period TP to each other.

As a result of the above-described replacement, the amplitude exceeding the threshold TH=0.5 has disappeared in the reproduced waveform RW as illustrated in FIG. 9, and this prevents the increase in the power consumption of the LRA motor 2 in the large amplitude period SVP. On the other hand, the resonant frequency period RFP includes the resonant frequency waveform vibrating at the resonant frequency of the LRA motor 2, and therefore, strong vibration intensity can be obtained even though the amplitude is suppressed in the resonant frequency period RFP.

As described above, according to the haptic pen 1 and the haptic control waveform generation method of the present embodiment, the resonant frequency period RFP is provided in the reproduced waveform RW, and this can realize strong vibration without increasing the amplitude of the reproduced waveform RW. Therefore, the increase in the power necessary for operating the LRA motor 2 can be suppressed, and the increase in the continuous operation time of the haptic pen 1 can be realized.

Although the preferred embodiment of the present disclosure has been described, the present disclosure is not limited to the embodiment in any way, and it is obvious that the present disclosure can be carried out in various modes without departing from the scope of the present disclosure.

Figure 13:
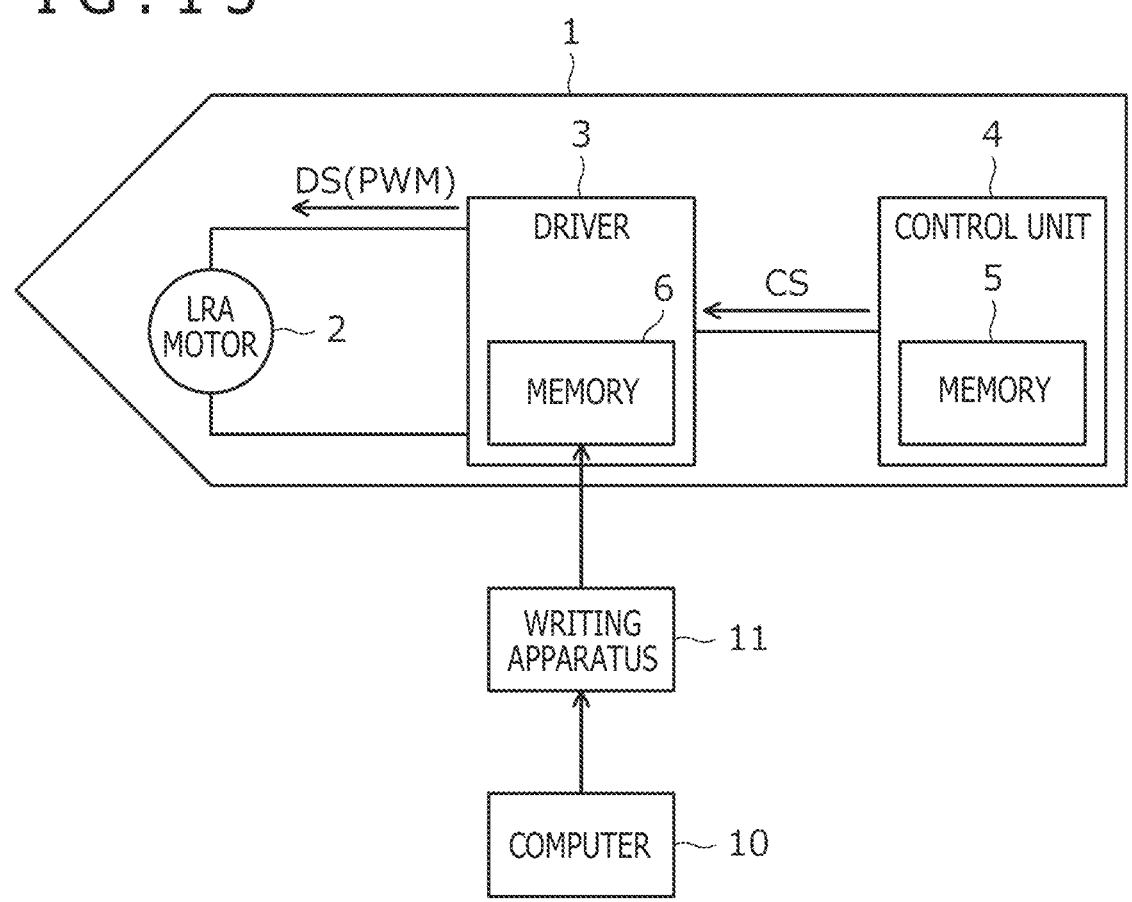
FIG. 13 is a diagram illustrating a configuration of the haptic pen 1 according to a first modification of the embodiment of the present disclosure.

FIG. 13 is a diagram illustrating a configuration of the haptic pen 1 according to a first modification of the embodiment. In the present modification, the memory 6 is provided in the driver 3, and one or more series of second digital values representing the reproduced waveforms RW are stored in the memory 6. In this case, the control signal CS supplied from the control unit 4 to the driver 3 includes information designating one of the one or more reproduced waveforms RW stored in the memory 6. The driver 3 is configured to read the reproduced waveform RW from the memory 6 according to the information and generate the drive signal DS (for example, the pulse width modulated signal PWM) on the basis of the read reproduced waveform RW. As a result, the LRA motor 2 operates according to the reproduced waveform RW designated by the control unit 4, at the timing indicated by the control signal CS supplied by the control unit 4 to the driver 3. In general, the capacity of the memory 6 is smaller than the capacity of the memory 5. However, when the amount of data of the reproduced waveform RW is sufficiently small to be allowed to be stored in the memory 6, the effects similar to the effects of the present embodiment can also be obtained by configuring the haptic pen 1 as in the present modification.

Figure 14:
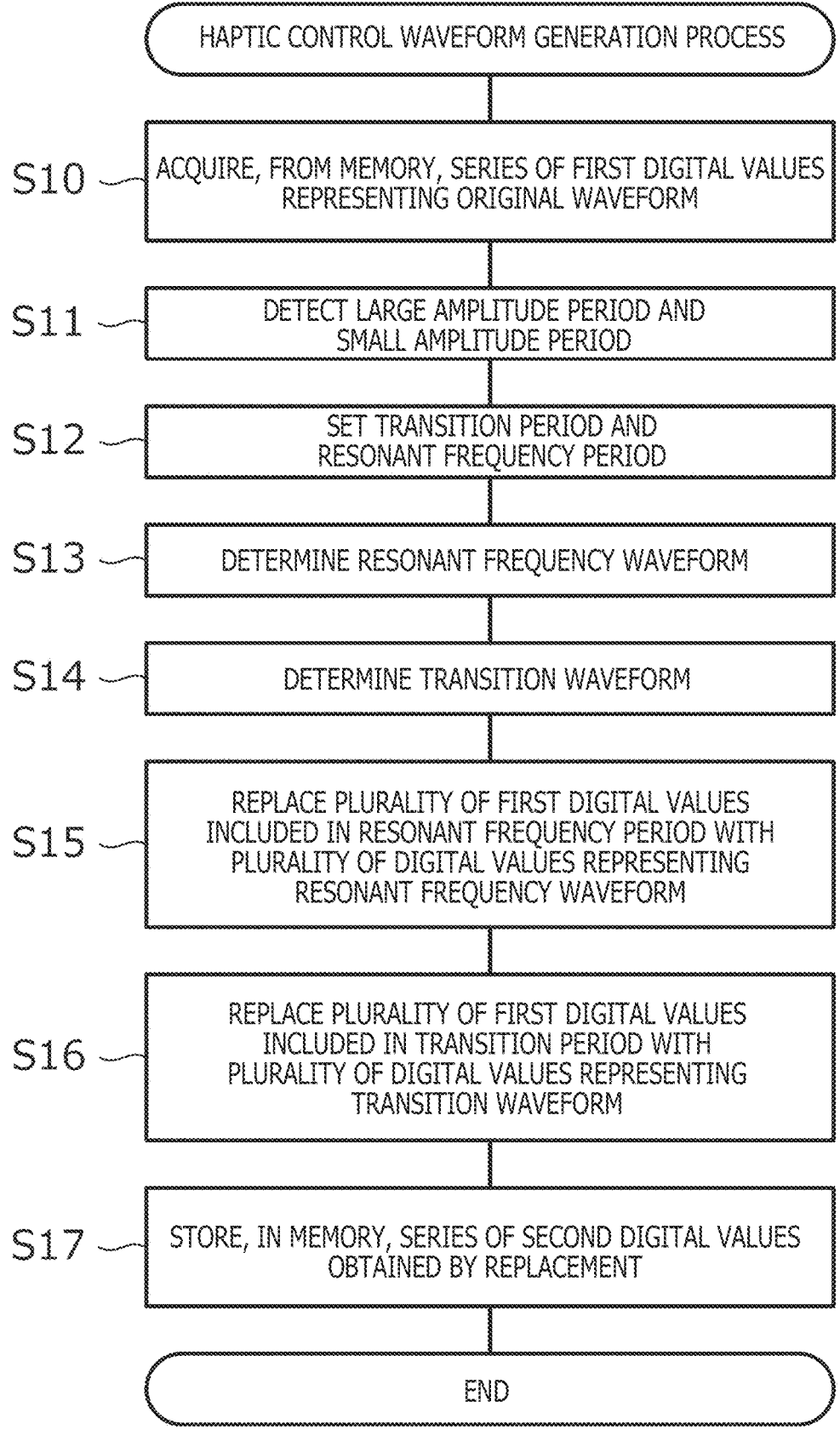
FIG. 14 is a process flow chart illustrating a process executed by the haptic pen 1 according to a second modification of the embodiment of the present disclosure to generate the reproduced waveform RW from the original waveform RW0.

FIG. 14 is a process flow chart illustrating a process executed by the haptic pen 1 according to a second modification of the embodiment to generate the reproduced waveform RW from the original waveform RW0. In the present modification, the haptic pen 1 executes the process of generating the reproduced waveform RW from the original waveform RW0, instead of the computer 10. FIG. 14 illustrates the process executed by the control unit 4 of the haptic pen 1, and the process is started in a state in which the series of first digital values are written to the memory 5. This writing is executed by a method similar to the method of writing, by the writing apparatus 11, the series of second digital values to the memory 5 described in the embodiment.

The control unit 4 first acquires the series of first digital values from the memory 5 (S10). The control unit 4 then executes a process similar to those at S2 to S7 illustrated in FIG. 4 (S11 to S16) and lastly writes, to the memory 5, the series of second digital values obtained by the replacement at S15 and 16. This writing may be overwriting of the first digital values. Such a process can be adopted to complete the conversion of the first digital values into the second digital values in the haptic pen 1. Moreover, before the conversion into the second digital values is finished, the first digital values can be used to operate the LRA motor 2.

Figure 15:
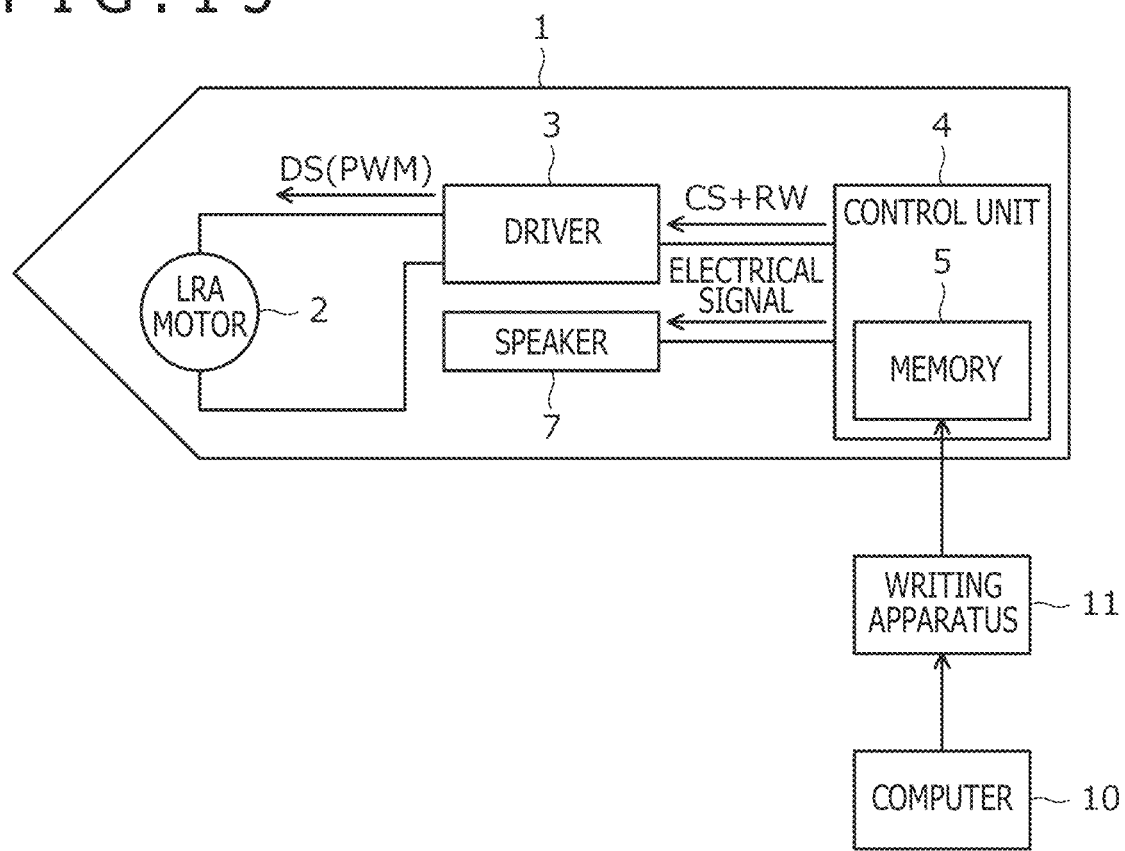
FIG. 15 is a diagram illustrating a configuration of the haptic pen 1 according to a third modification of the embodiment of the present disclosure.
Figure 16:
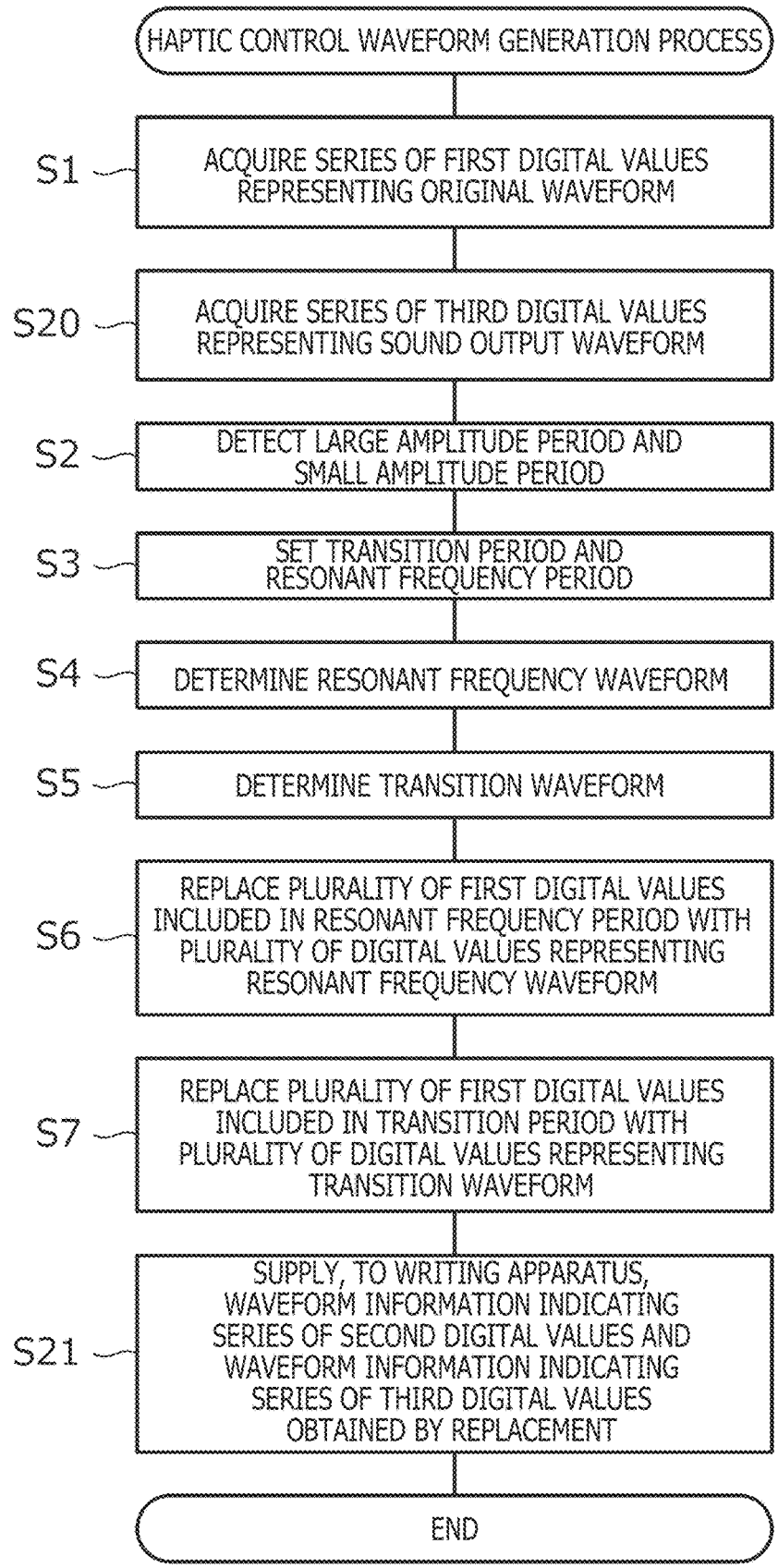
FIG. 16 is a process flow chart illustrating a process executed by the computer 10 according to a third modification of the embodiment of the present disclosure to generate the reproduced waveform RW from the original waveform RW0.

FIG. 15 is a diagram illustrating a configuration of the haptic pen 1 according to a third modification of the embodiment, and FIG. 16 is a process flow chart illustrating a process executed by the computer 10 of the present modification to generate the reproduced waveform RW from the original waveform RW0. First, with reference to FIG. 15, the haptic pen 1 of the present modification further includes a speaker 7 that outputs sound according to an electrical signal output from the control unit 4.

Next, with reference to FIG. 16, the computer 10 of the present modification is configured to also acquire a series of third digital values representing a sound output waveform, when the computer 10 acquires the series of first digital values at S1 (S20). In addition, the computer 10 also supplies waveform information indicating the series of third digital values to the writing apparatus 11, when the computer 10 supplies the waveform information indicating the series of second digital values to the writing apparatus 11 (S21). The writing apparatus 11 that has received the supply writes both the waveform information indicating the series of second digital values and the waveform information indicating the series of third digital values to the memory 5 of the haptic pen 1 at an appropriate timing. The operation of the control unit 4 after the waveform information indicating the series of second digital values is written to the memory 5 is as described above. On the other hand, after the waveform information indicating the series of third digital values is written to the memory 5, the control unit 4 generates an electrical signal for controlling the speaker 7, on the basis of the written waveform information. The control unit 4 then supplies the generated electrical signal to the speaker 7 to reproduce the sound output waveform indicated by the series of third digital values. As a result, the sound can be output from the speaker 7 according to the operation of the LRA motor 2.

Note that, although the speaker 7 that outputs sound is provided in the haptic pen 1 in the example described in the present modification, the LRA motor 2 may be configured to also output the sound in addition to the vibration. In this case, a series of digital values representing a waveform obtained by combining the reproduced waveform RW (the series of second digital values) and the sound output waveform (the series of third digital values) may be written to the memory 5. In this way, the LRA motor 2 can be configured to output both the vibration and the sound.

Figure 17A:
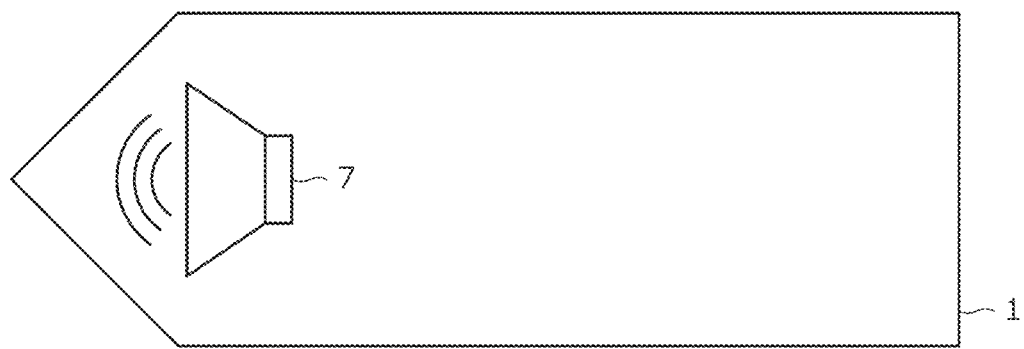
FIGS. 17A to 17C are diagrams illustrating examples of arrangement of a speaker 7 in the haptic pen 1 according to the third modification of the embodiment of the present disclosure.
Figure 17B:
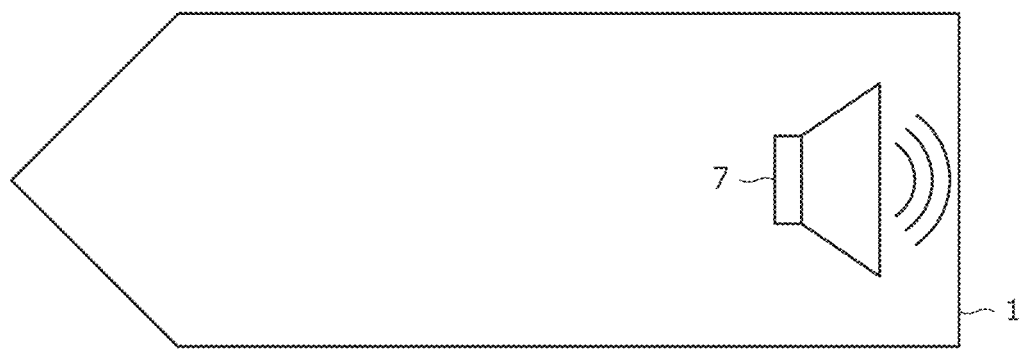
Figure 17C:
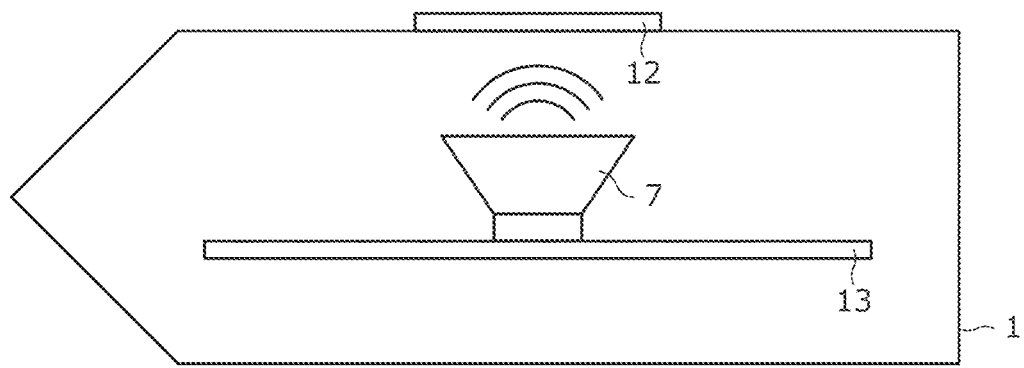

FIGS. 17A to 17C are diagrams illustrating examples of arrangement of the speaker 7 in the haptic pen 1. FIG. 17A illustrates an example of arranging the speaker 7 near the pen tip of the haptic pen 1. FIG. 17B illustrates an example of arranging the speaker 7 near the back end of the haptic pen 1. FIG. 17C illustrates an example of arranging the speaker 7 on a printed board 13 arranged in the haptic pen 1.

The position of the speaker 7 in the haptic pen 1 is closely related to the directivity of sound output from the speaker 7. Specifically, when the speaker 7 is arranged near the pen tip as in FIG. 17A, the sound is output from the front end of the haptic pen 1 toward the front direction. When the speaker 7 is arranged near the back end as in FIG. 17B, the sound is output from the back end of the haptic pen 1 toward the rear direction. When the speaker 7 is arranged on the printed board 13 as in FIG. 17C, the sound is output from the side surface of the haptic pen 1 to the side direction. Note that the speaker 7 is arranged on the printed board 13 in the example of FIG. 17C because it is preferable to output the sound toward an illustrated side switch 12 (switch provided on the side surface of the haptic pen 1) when the sound is output in the side direction. However, it is only necessary that the arrangement makes it possible to output the sound toward the side switch 12, and the speaker 7 may not be arranged on the printed board 13.

Note that, although one speaker 7 is provided in the haptic pen 1 in the examples illustrated in FIGS. 17A to 17C, two or more speakers 7 may be provided in the haptic pen 1. In this case, the speakers 7 may be arranged at a plurality of positions with different directivity of sound, such as at the position illustrated in FIG. 17A and the position illustrated in FIG. 17B. In addition, the sound may be output at the same time from the plurality of speakers 7, or one or more speakers 7 may be selected on the basis of the state of the haptic pen 1, the user setting, and the like to output the sound from only the selected speaker(s) 7. For example, when the haptic pen 1 is used to make a drawing, the sound may be output from the speaker 7 arranged at the position of FIG. 17A toward the front direction. When the haptic pen 1 is used to press a button displayed on the display, the sound may be output from the speaker 7 arranged at the position of FIG. 17B toward the rear direction. In addition, the speaker 7 may be provided outside the haptic pen 1 (for example, the speaker 7 may be wrapped around a housing of the haptic pen 1) instead of inside the haptic pen 1.

Figure 18:
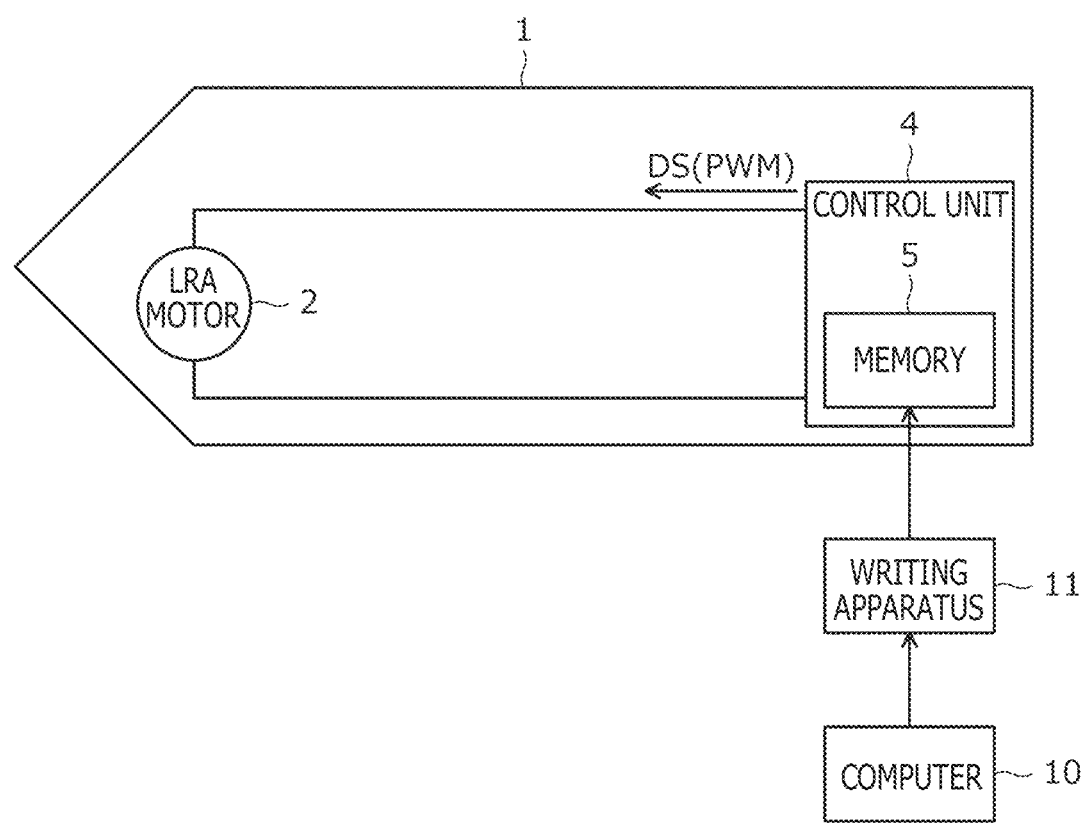
FIG. 18 is a diagram illustrating a configuration of the haptic pen 1 according to a fourth modification of the embodiment of the present disclosure.

FIG. 18 is a diagram illustrating a configuration of the haptic pen 1 according to a fourth modification of the embodiment. In the present modification, the control unit 4 has the function of generating the drive signal DS of the LRA motor 2 on the basis of the reproduced waveform RW and supplying the drive signal DS to the LRA motor 2, and the control unit 4 plays a role of the driver 3. In this way, the control unit 4 may have the function of the driver 3.

DESCRIPTION OF REFERENCE SYMBOLS

1: Haptic pen
2: LRA motor
3: Driver
4: Control unit
5, 6: Memory
7: Speaker
10: Computer
11: Writing apparatus
CS: Control signal
DS: Drive signal
PWM: Pulse width modulated signal
RFP: Resonant frequency period
RW: Reproduced waveform
RW0: Original waveform
SVP: Large amplitude period
TP: Transition period
WVP: Small amplitude period The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A haptic pen comprising:
   a memory that stores a reproduced waveform; and
   a haptic element that operates according to the reproduced waveform,
   wherein the reproduced waveform includes a resonant frequency period including a waveform of a sine wave vibrating at a resonant frequency of the haptic element and a period including a waveform vibrating at one or more frequencies different from the resonant frequency.

2. The haptic pen according to claim 1, wherein
   the resonant frequency is a frequency corresponding to a peak of a vibration intensity of the haptic element.

3. The haptic pen according to claim 1, wherein
   a period of the reproduced waveform other than the resonant frequency period includes a waveform obtained by sampling a signal including one or more frequency components.

4. The haptic pen according to claim 1, wherein
   the reproduced waveform includes a series of digital values.

5. The haptic pen according to claim 4, further comprising:
   a haptic driver that generates a drive signal based on the reproduced waveform,
   wherein the haptic element, in operation, operates according to the drive signal to operate according to the reproduced waveform.

6. The haptic pen according to claim 5, wherein
   the drive signal is a pulse width modulated signal obtained by modulating a pulse width based on the reproduced waveform, an amplitude modulated signal obtained by modulating an amplitude based on the reproduced waveform, a frequency modulated signal obtained by modulating a frequency based on the reproduced waveform, a phase modulated signal obtained by modulating a phase based on the reproduced waveform, or the series of digital values representing the reproduced waveform.

7. A haptic control waveform generation method comprising:
   acquiring a series of first digital values representing an original waveform for operating a haptic element provided in a haptic pen;
   detecting a large amplitude period of the original waveform, in which the original waveform satisfies a predetermined condition in the large amplitude period; and
   generating a series of second digital values which represent a reproduced waveform for operating the haptic element, by replacing at least some of a plurality of first digital values included in the large amplitude period with a plurality of digital values representing a waveform of a sine wave vibrating at a resonant frequency of the haptic element.

8. The haptic control waveform generation method according to claim 7, further comprising:
   storing waveform information indicating the series of second digital values in a memory of the haptic pen.

9. The haptic control waveform generation method according to claim 8, further comprising:
   storing waveform information indicating the series of first digital values in the memory of the haptic pen,
   wherein the storing the waveform information indicating the series of second digital values in the memory of the haptic pen includes overwriting the waveform information indicating the series of first digital values stored in the memory of the haptic pen.

10. The haptic control waveform generation method according to claim 7, wherein,
the generating the series of second digital values includes determining an amplitude of the waveform of the sine wave based on a vibration intensity of the haptic element realized in a resonant frequency period including part of the large amplitude period of the original waveform.

11. The haptic control waveform generation method according to claim 10, wherein
the resonant frequency period includes a part not included in a transition period of the large amplitude period, the transition period being provided at a boundary of the large amplitude period and a small amplitude period in which an amplitude of the original waveform is smaller than a threshold.

12. The haptic control waveform generation method according to claim 7, wherein
the resonant frequency is a frequency corresponding to a peak of a vibration intensity of the haptic element.

13. The haptic control waveform generation method according to claim 7, wherein
the original waveform is obtained by sampling an analog signal including one or more frequency components.

14. The haptic control waveform generation method according to claim 8, wherein
the waveform information indicating the series of second digital values is data indicated by digital values of each of a plurality of time points.

15. The haptic control waveform generation method according to claim 8, further comprising:
acquiring a series of third digital values representing a sound output waveform,
wherein the storing the waveform information indicating the series of second digital values in the memory of the haptic pen includes storing the waveform information indicating the series of second digital values and waveform information indicating the series of third digital values in the memory of the haptic pen.

* * * * *